US010158659B1

United States Patent
Huang et al.

(10) Patent No.: US 10,158,659 B1
(45) Date of Patent: Dec. 18, 2018

(54) PHONY PROFILES DETECTOR

(71) Applicant: Microsoft Technology Licensing, LLC, Redmond, WA (US)

(72) Inventors: Xiaosu Huang, Sunnyvale, CA (US); Ziliang Lin, Menlo Park, CA (US); Chi-Yi Kuan, Fremont, CA (US); Haiming Zhao, San Ramon, CA (US)

(73) Assignee: Microsoft Tehnology Licensing, LLC, Redmond, WA (US)

( * ) Notice: Subject to any disclaimer, the term of this patent is extended or adjusted under 35 U.S.C. 154(b) by 77 days.

(21) Appl. No.: 15/097,004

(22) Filed: Apr. 12, 2016

(51) Int. Cl.
*H04L 9/00* (2006.01)
*H04L 29/06* (2006.01)
*G06F 3/0482* (2013.01)

(52) U.S. Cl.
CPC ........ *H04L 63/1425* (2013.01); *G06F 3/0482* (2013.01); *H04L 63/102* (2013.01); *H04L 63/1433* (2013.01)

(58) Field of Classification Search
CPC ............... H04L 63/102; H04L 63/1425; H04L 63/1433; G06F 3/0482
See application file for complete search history.

(56) References Cited

U.S. PATENT DOCUMENTS 9,654,512 B2 * 5/2017 Dunne .................... H04L 63/20
2011/0296004 A1 * 12/2011 Swahar ............... G06F 17/3053
709/224

* cited by examiner

*Primary Examiner* — Beemnet W Dada
(74) *Attorney, Agent, or Firm* — Schwegman Lundberg & Woessner, P.A.

(57) ABSTRACT

A phony profiles detector for an on-line social network system is described. The phony profiles detector uses characteristics of a profile that was associated with an indication that it represents a malicious user, a so-called seed profile, to identify other profiles that should be flagged as potentially the source of undesirable behavior. Based on the degree of similarity determined for a subject profile with respect to a seed profile, the phony profiles detector generates a malicious user indicator and stores it as associated with the subject profile.

16 Claims, 4 Drawing Sheets

PHONY PROFILES DETECTOR

TECHNICAL FIELD

This application relates to the technical fields of software and/or hardware technology and, in one example embodiment, to system and method to identify potentially phony profiles based on their connectedness to a profile of a known malicious user within an on-line social network system.

BACKGROUND

An on-line social network may be viewed as a platform to connect people in virtual space. An on-line social network may be a web-based platform, such as, e.g., a social networking web site, and may be accessed by a use via a web browser or via a mobile application provided on a mobile phone, a tablet, etc. An on-line social network may be a business-focused social network that is designed specifically for the business community, where registered members establish and document networks of people they know and trust professionally. Each registered member may be represented by a member profile. A member profile may be represented by one or more web pages, or a structured representation of the member's information in XML (Extensible Markup Language), JSON (JavaScript Object Notation) or similar format. A member's profile web page of a social networking web site may emphasize employment history and education of the associated member.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

Figure 1:
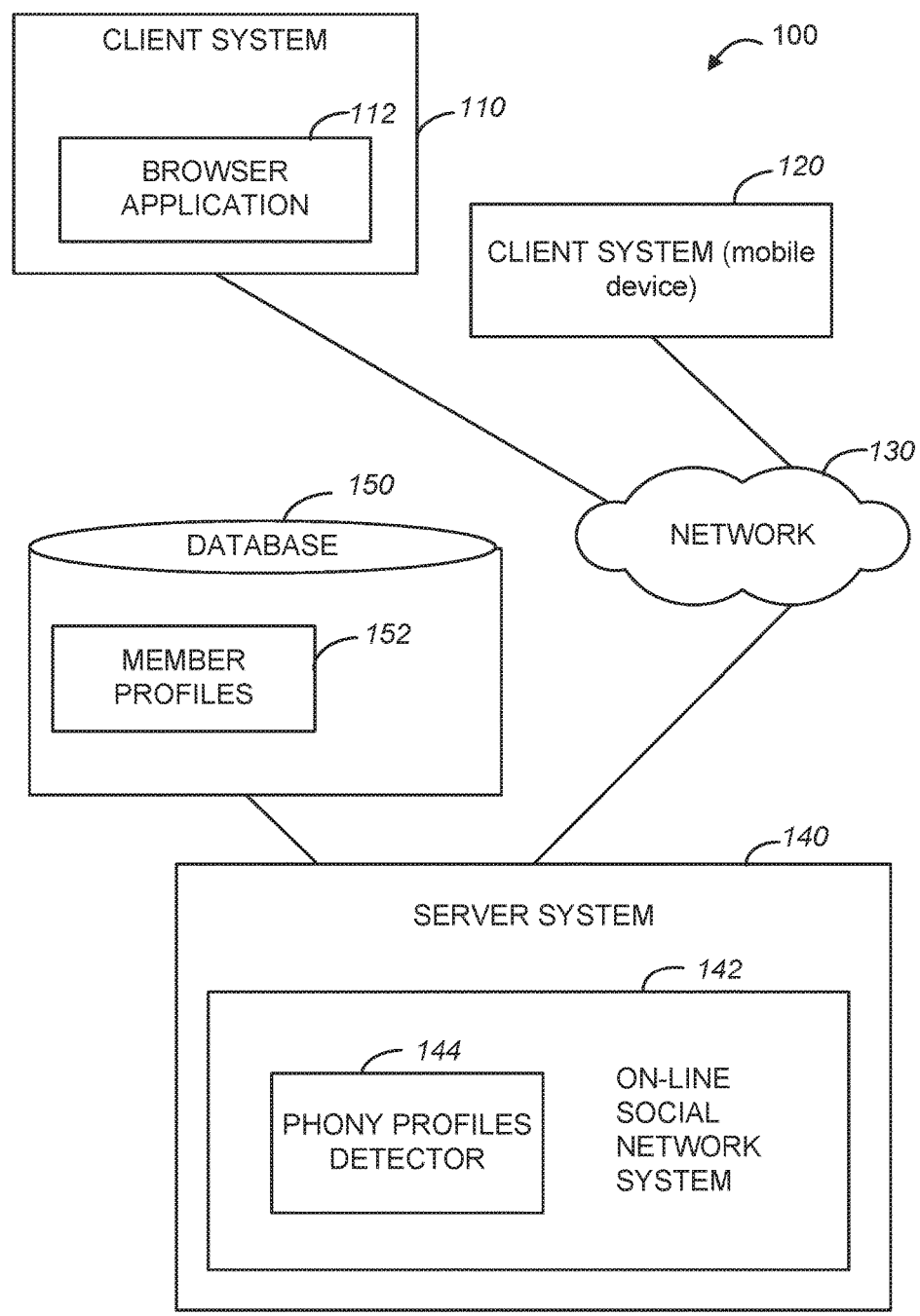
FIG. 1 is a diagrammatic representation of a network environment within which an example method and system to identify potentially phony profiles in an on-line environment may be implemented.

A method and system to identify potentially phony profiles based on their connectedness to a profile of a known malicious user in the context of an on-line social network is described. In the following description, for purposes of explanation, numerous specific details are set forth in order to provide a thorough understanding of an embodiment of the present invention. It will be evident, however, to one skilled in the art that the present invention may be practiced without these specific details.

As used herein, the term "or" may be construed in either an inclusive or exclusive sense. Similarly, the term "exemplary" is merely to mean an example of something or an exemplar and not necessarily a preferred or ideal means of accomplishing a goal. Additionally, although various exemplary embodiments discussed below may utilize Java-based servers and related environments, the embodiments are given merely for clarity in disclosure. Thus, any type of server environment, including various system architectures, may employ various embodiments of the application-centric resources system and method described herein and is considered as being within a scope of the present invention.

For the purposes of this description the phrase "an on-line social networking application" may be referred to as and used interchangeably with the phrase "an on-line social network" or merely "a social network." It will also be noted that an on-line social network may be any type of an on-line social network, such as, e.g., a professional network, an interest-based network, or any on-line networking system that permits users to join as registered members. For the purposes of this description, registered members of an on-line social network may be referred to as simply members.

Each member of an on-line social network is represented by a member profile (also referred to as a profile of a member or simply a profile). The profile information of a social network member may include personal information such as, e.g., the name of the member, current and previous geographic location of the member, current and previous employment information of the member, information related to education of the member, information about professional accomplishments of the member, publications, patents, etc. The profile information of a social network member may also include information about the member's professional skills, such as, e.g., "product management," "patent prosecution," "image processing," etc.). The profile of a member may also include information about the member's current and past employment, such as company identifications, professional titles held by the associated member at the respective companies, as well as the member's dates of employment at those companies.

A member profile is also associated with social links that indicate the associated member's connection to other members of the social network. Any two members of a social network may indicate their mutual willingness to be "connected" in the context of the social network, in that they can view each other's profiles, profile recommendations and endorsements for each other and otherwise be in touch via the social network. Members who are connected in the context of a social network may be termed each other's "connections" and their respective profiles are associated with respective connection links indicative of these two profiles being connected.

In the context of an on-line social network, users are provided with an ability to register for an account, create a member profile, and connect with other members of the on-line social network. While most of these accounts are used for legitimate purposes, some less than scrupulous users choose to utilize the on-line social network for malicious or unsavory purposes, such as, e.g., spam or phishing. A fraud prevention component of the on-line social network may be designed to detect undesirable activities on the on-line social network site and take measures to stop the perpetrators from continuing to engage in such behavior. For example, the fraud prevention component may generate a malicious user indicator and store it as associated with the profile that originated undesirable activities on the on-line social network site. Based on the malicious user indicator, a member represented by the associated profile may be blocked or restricted from some or all of the activities on the on-line social network site.

A member profile associated with the malicious user indicator is considered to be representing a known malicious user. The characteristics of such profile and the associated information may be used, in one example embodiment, to identify other member profiles that are likely to originate undesirable activities on the on-line social network site. When a profile associated with the malicious user indicator is being used to identify other member profiles that may originate undesirable activities, it is termed a seed profile. In one example embodiment, the on-line social network includes a so-called phony profiles detector configured to identify, based the strength of their connection with a seed profile, other member profiles that potentially or actually originate undesirable activities.

Based on the determined strength of connection (also referred to as a degree of similarity) of a subject profile with a seed profile, the phony profiles detector generates a malicious user indicator and stores it as associated with the subject profile. A measure of similarity determined for a subject profile with respect to a seed profile is termed a connectedness score for the subject profile. A connectedness score may also be viewed as expressing the likelihood that a member represented by the subject profile is a malicious user.

The connection strength between two profiles is determined by examining various types of information that characterizes a member profile in the on-line social network system. For example, if the same malicious user created multiple accounts (and the associated member profiles) on the on-line social network site in order to perpetrate their malicious or inappropriate activities, these profiles may all have similar traits, such as, e.g., the IP address used for login, geographic location associated with the IP address, the time when the respective accounts were created, mutual connections, same or similar posts, same or similar email addresses, same phone number, etc. The types of data used to determine a degree of similarity between a seed profile and another profile are termed connection categories. Some examples of connection categories is shown below.

Registration information. This category includes information, such as the IP address used to register for an account with the on-line social network system and to create a member profile, as well as the time, at which the account was created. If two or more profiles were created using the same IP address, in close temporal proximity, it may be an indication that these two profiles may have been created by the same potentially malicious user.

Email information. The same domain, especially when coupled with similar email names (e.g., michael@yahoo.com and michael10@yahoo.com, etc.) may be an indication that these two profiles may have been created by the same potentially malicious user.

First and last name. This category includes information, such as first and last name of a member that appears in a member profile.

Last Login IP address and Last Login Time. This category includes information, such as the IP address used for the most recent login with respect to the on-line social network system and also the time of the most recent login.

Region. This category includes information, such as the geographic location of the associated member, as indicated in the member profile or as indicated by the IP address used for login.

Language. This category includes information, such as the language used in the member profile.

Phone number. This category includes information, such as the member's phone number.

Connection link to seed profile. This category includes information indicating whether the subject profile and the seed profile include connection links indicating that the respective members are each other's connections.

Login time. This category includes information that may be indicative of a login pattern of a member.

Shared connection links. This category includes information, such as which other members in the on-line social network system have connection links to both the subject profile and the seed profile.

User-generated content similarity. This category includes information that provides an insight into similarity of content that is being posted by the subject profile and the seed profile in the on-line social network system Number of mutual profile views. This category includes information that may indicate that views of certain other profiles in the on-line social network system originated from the subject profile and also from the seed profile.

At least some information represented by one or more of these categories is used by the phony profiles detector to generate a connectedness score for a subject profile with respect to a seed profile. In one embodiment, if the connectedness score is at or above a certain predetermined threshold value, the phony profiles detector associates the subject profile with a malicious user indicator. A malicious user indicator is used by one or more modules if the on-line social network system to determine what actions are permitted and what actions are restricted to a member represented by the associated member profile. In response to determining that the connectedness score is at or above a certain predetermined threshold value, the phony profiles detector may include the subject profile into a cluster of profilers that have been identified as representing potentially malicious users.

A connectedness score for a subject profile with respect to a seed profile is determined by comparing respective information from a selected set of connection categories of the seed profile and the subject profile and, for each connection category from the selected set (for example, in some embodiments, only a subset of the categories listed and described above may be used by the phony profile detector), generating a respective partial connectedness score based on the result of the comparing. For example, comparing information reflecting if and how often respective members represented by the seed profile and the subject profile view the same member profiles in the on-line social network system results in a partial connectedness score associated with the Mutual Profile Views connection category. Comparing email addresses of the seed profile results in a partial connectedness score associated with the Email Address connection category. A connectedness score for a subject profile with respect to a seed profile is calculated as the sum of the partial connectedness scores.

A partial connectedness score generated with respect to a connection category may be assigned a weight indicating the importance of a connection category relative to other connection categories. These weights could be used when the partial connectedness scores generated for the seed profile and the subject profile are combined (e.g., added) to generate the connectedness score that is used by the phony profiles detector to determine whether the subject profile manifests sufficient similarity with the seed profile to be also associated with a malicious user indicator. For example, a partial connectedness score generated with respect to the user-generated content category may be assigned a greater weight than a partial connectedness score generated with respect to the language category. An example phony profiles detector may be implemented in the context of a network environment 100 illustrated in FIG. 1.

As shown in FIG. 1, the network environment 100 may include client systems 110 and 120 and a server system 140. The client system 120 may be a mobile device, such as, e.g., a mobile phone or a tablet. The server system 140, in one example embodiment, may host an on-line social network system 142. As explained above, each member of an on-line social network is represented by a member profile that contains personal and professional information about the member and that may be associated with social links that indicate the member's connection to other member profiles in the on-line social network. Member profiles and related information may be stored in a database 150 as member profiles 152. It will be noted that, in some embodiments, the database 150 is considered to be part of the on-line social network system 142.

The client systems 110 and 120 may be capable of accessing the server system 140 via a communications network 130, utilizing, e.g., a browser application 112 executing on the client system 110, or a mobile application executing on the client system 120. The communications network 130 may be a public network (e.g., the Internet, a mobile communication network, or any other network capable of communicating digital data). As shown in FIG. 1, the server system 140 also hosts a phony profiles detector 144. The phony profiles detector is configured to have capabilities of a phony profiles detector described above. It will be noted that, in some embodiments, the phony profiles detector 144 is considered to be part of the on-line social network system 142. An example phony profiles detector 144 is illustrated in FIG. 2.

Figure 2:
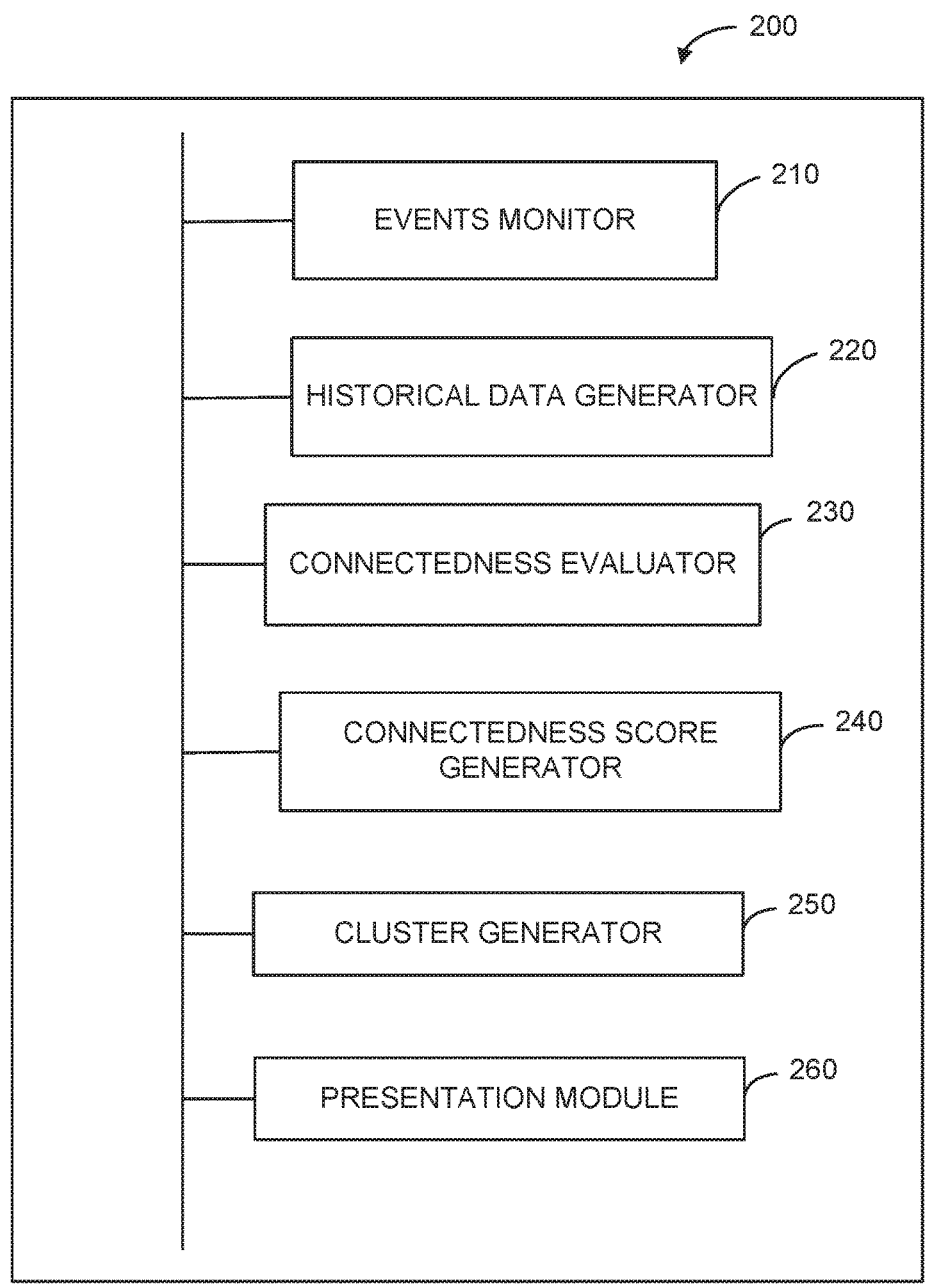
FIG. 2 is block diagram of a system to identify potentially phony profiles in an on-line environment, in accordance with one example embodiment.

FIG. 2 is a block diagram of a system 200 to identify potentially phony profiles based on their connectedness to a profile of a known malicious user in the on-line social network system 142 of FIG. 1. As shown in FIG. 2, the system 200 includes an events monitor 210, a historical data generator 220, a connectedness evaluator 230, a connectedness score generator 240, a cluster generator 250, and a presentation module 260.

The events monitor 210 is configured to monitor events in an on-line social networking system that are originated by a subject member profile and a seed profile. As explained above, a member profile associated with a malicious user indicator is referred to as a seed profile and can be used to identify other profiles that should be flagged with a malicious user indicator as representing a potentially malicious user.

The historical data generator 220 is configured to generate respective historical data for the subject member profile and the seed profile based on the monitored events. The connectedness evaluator 230 is configured to evaluate connectedness between the seed profile and the subject member profile using respective information in the seed profile and the subject member and the respective historical data for the subject member profile and the seed profile.

The connectedness score generator 240 is configured to generate a connectedness score for the subject member profile with respect to the seed profile based on the result of the evaluating. In one embodiment, the connectedness score generator 240 generates one or more partial connectedness scores based on the results of comparing respective information of the connection categories of the seed profile and the subject profile for various connectedness categories and generates a connectedness score for the subject member profile with respect to the seed profile as a sum of the partial connectedness scores. As explained above, one example of a connectedness category is registration time and network address. The connectedness score generator 240 generates an associated partial connectedness score by comparing respective registration times and IP addresses associated with the seed profile and the subject profile. Another example of a connectedness category is email address, and the generating of a partial connectedness score comprises comparing respective one or more parts of the respective email addresses associated with the seed profile and the subject profile. Yet another example of a connectedness category is login time, and the generating of a partial connectedness score comprises comparing respective login times associated with the seed profile and the subject profile. A further example of a connectedness category is content similarity, and the generating of a partial connectedness score comprises comparing content generated by the seed profile and the subject profile, respectively, in the on-line social network system.

The cluster generator 250 is configured to store the malicious user indication as associated with the subject member profile based on the connectedness score. In some embodiments, the cluster generator 250 includes the profiles that have been identified as having a certain degree of similarity with a seed profile in a cluster of phony profiles associated. Each profile in the cluster of phony profiles is associated with the malicious user indicator. A cluster of phony profiles may be associated with a single seed profile or with a group of seed profiles.

The presentation generator 260 is configured to generate a user interface including an identification of a subject profile that has been identified as representing a potentially malicious user. The presentation generator 260 is also capable of generating a user interface that includes a listing of items identifying phony profiles in a cluster of phony profiles. The presentation generator 260 is configured to cause presentation of the user interface on a display device.

The system 200, in some embodiments, also includes a request processor (not shown). The request processor may be configures to receive a request from a seed profile associated with a malicious user indicator and deny the request based on the malicious user indicator associated with the seed profile. A denied request may be, e.g., a request to create a connection link between the seed profile and another profile representing another member in the on-line social network system. Some operations performed by the system 200 may be described with reference to FIG. 3.

Figure 3:
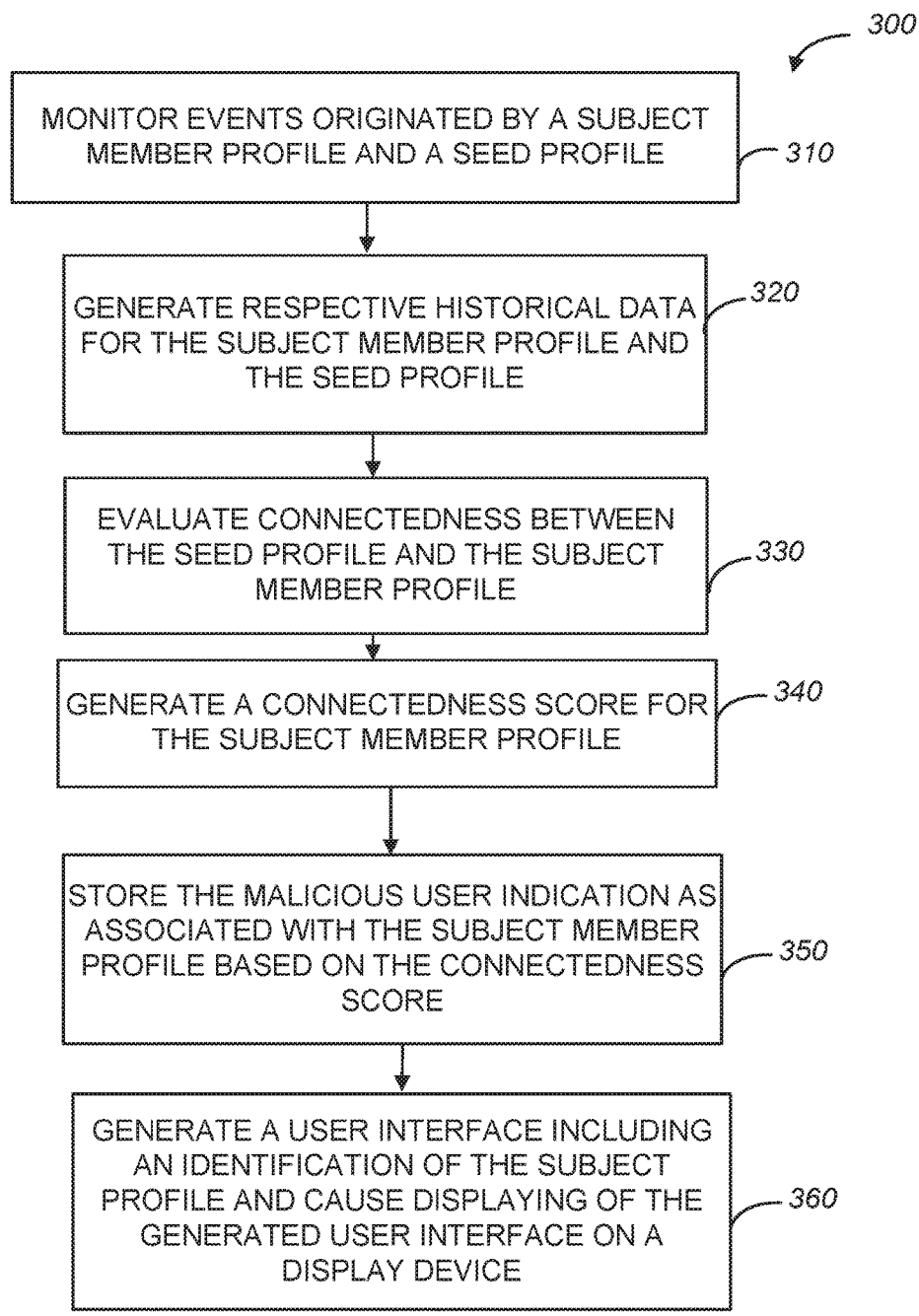
FIG. 3 is a flow chart illustrating a method to identify potentially phony profiles based on their connectedness to a profile of a known malicious user in an on-line environment, in accordance with an example embodiment.

FIG. 3 is a flow chart of a method 300 to identify potentially phony profiles based on their connectedness to a profile of a known malicious user in an on-line social network system 142 of FIG. 1. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 shown in FIG. 2.

As shown in FIG. 3, the method 300 commences at operation 310, when the events monitor 210 of FIG. 2 monitor events in an on-line social networking system that are originated by a subject member profile and a seed profile. As explained above, a member profile associated with a malicious user indicator is referred to as a seed profile and can be used to identify other profiles that should be flagged with a malicious user indicator as representing a potentially malicious user. At operation 320, the historical data generator 220 of FIG. 2 generates respective historical data for the subject member profile and the seed profile based on the monitored events. The connectedness evaluator 230 of FIG. 2 evaluates connectedness between the seed profile and the subject member profile using respective information in the seed profile and the subject member and the respective historical data for the subject member profile and the seed profile, at operation 330.

The connectedness score generator 240 of FIG. 2 generates a connectedness score for the subject member profile with respect to the seed profile based on the result of the evaluating, at operation 340. The cluster generator 250 of FIG. 2 stores the malicious user indication as associated with the subject member profile based on the connectedness score, at operation 350. At operation 360, the presentation generator 260 of FIG. 2 generates a user interface including an identification of a subject profile that has been identified as representing a potentially malicious user and causes presentation of the user interface on a display device.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least sonic of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Figure 4:
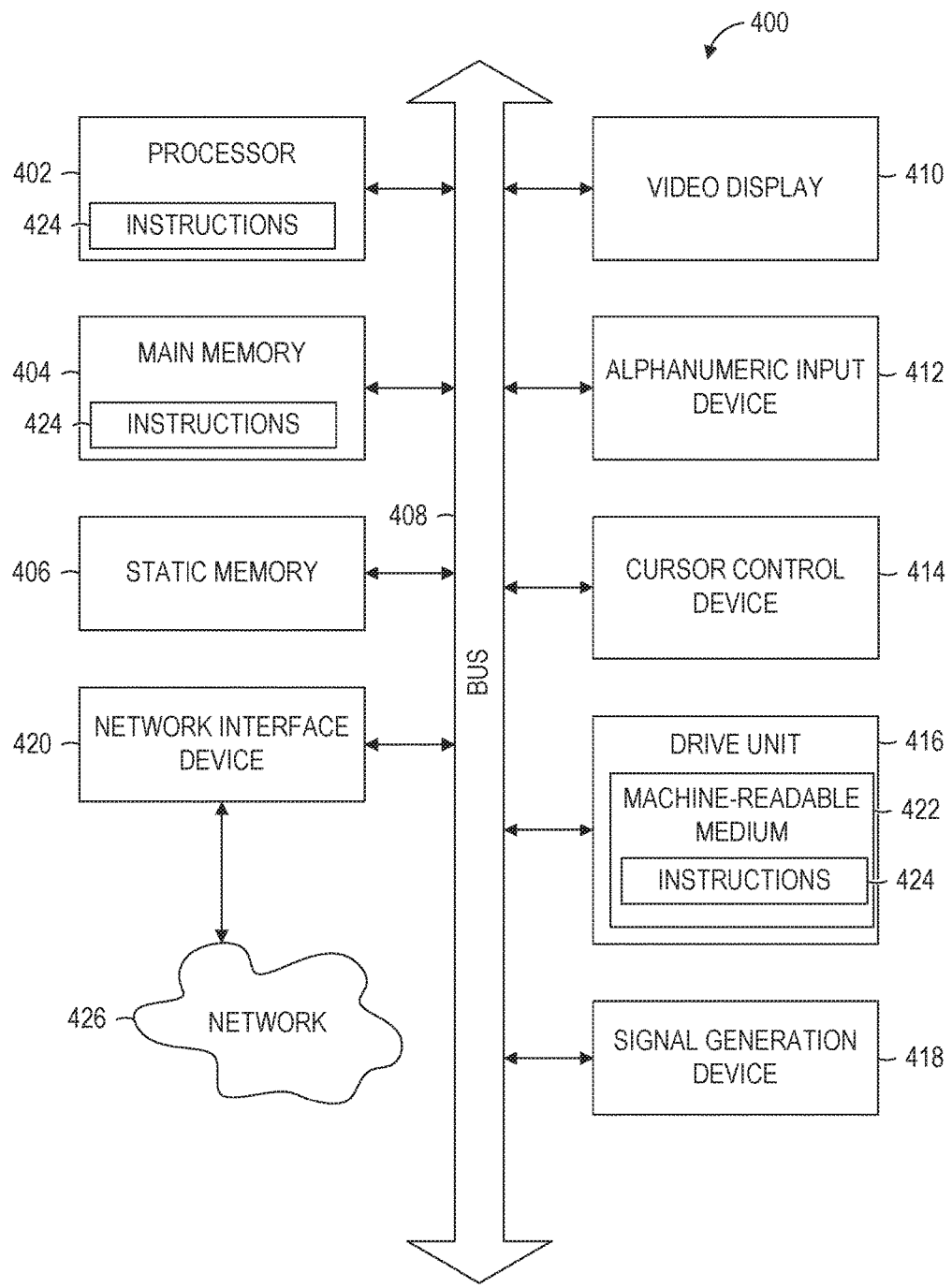
FIG. 4 is a diagrammatic representation of an example machine in the form of a computer system within which a set of instructions, for causing the machine to perform any one or more of the methodologies discussed herein, may be executed.

FIG. 4 is a diagrammatic representation of a machine in the example form of a computer system 400 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 404. The computer system 400 may further include a video display unit 410 (e.g., a liquid crystal display (LCD) or a cathode ray tube (CRT)). The computer system 400 also includes an alpha-numeric input device 412 (e.g., a keyboard), a user interface (UI) navigation device 414 (e.g., a cursor control device), a disk drive unit 416, a signal generation device 418 (e.g., a speaker) and a network interface device 420.

The disk drive unit 416 includes a machine-readable medium 422 on which is stored one or more sets of instructions and data structures (e.g., software 424) embodying or utilized by any one or more of the methodologies or functions described herein. The software 424 may also reside, completely or at least partially, within the main memory 404 and/or within the processor 402 during execution thereof by the computer system 400, with the main memory 404 and the processor 402 also constituting machine-readable media.

The software 424 may further be transmitted or received over a network 426 via the network interface device 420 utilizing any one of a number of well-known transfer protocols (e.g., Hyper Text Transfer Protocol (HTTP)).

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

MODULES, COMPONENTS AND LOGIC

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Thus, a method and system to identify potentially phony profiles based on their connectedness to a profile of a known malicious user in an on-line environment has been described. Although embodiments have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense.

The invention claimed is:

1. A computer-implemented method comprising:
comparing respective registration times and IP addresses associated with a seed profile and a subject profile representing respective members in an on-line social networking system, the seed profile associated with a malicious user indicator;
generating a partial connectedness score based on the results of the comparing;
using at least one processor, generating a connectedness score for the subject profile with respect to the seed profile based on the result of the comparing, as a sum of the partial connectedness score and one or more other values;
modifying the subject profile by storing the malicious user indication as associated with the subject profile based on the connectedness score.

2. The method of claim 1, comprising including the subject profile in a cluster of phony profiles, each profile in the cluster of phony profiles associated with the malicious user indicator.

3. The method of claim 2, comprising:
generating a user interface including a listing of items identifying phony profiles in the cluster of phony profiles; and
causing presentation of the user interface on a display device.

4. The method of claim 1, wherein a category from the plurality of connectedness categories is email address, the generating of a partial connectedness score comprises comparing respective one or more parts of the respective email addresses associated with the seed profile and the subject profile.

5. The method of claim 1, wherein a category from the plurality of connectedness categories is login time, the generating of a partial connectedness score comprises comparing respective login times associated with the seed profile and the subject profile.

6. The method of claim 1, wherein a category from the plurality of connectedness categories is content similarity, the generating of a partial connectedness score comprises comparing content generated by the seed profile and the subject profile, respectively, in the on-line social network system.

7. The method of claim 1, comprising:
receiving a request from the seed profile in the on-line social network system; and
denying the request based on the malicious user indicator associated with the seed profile.

8. The method of claim 1, wherein the request is a request to create a connection link between the seed profile and another profile representing another member in the on-line social network system.

9. A computer-implemented system comprising:
one or more processors; and
a non-transitory computer readable storage medium comprising instructions that when executed by the one or processors cause the one or more processors to perform operations comprising:
comparing respective registration times and IP addresses associated with a seed profile and a subject profile representing respective members in an on-line social networking system, the seed profile associated with a malicious user indicator;
generating a partial connectedness score based on the results of the comparing;
generating a connectedness score for the subject profile with respect to the seed profile based on the result of the comparing, as a sum of the partial connectedness score and one or more other values;
modifying the subject profile by storing the malicious user indication as associated with the subject profile based on the connectedness score.

10. The system of claim 9, wherein the cluster generator is to include the subject profile in a cluster of phony profiles, each profile in the cluster of phony profiles associated with the malicious user indicator.

11. The system of claim 10, comprising a presentation generator, implemented using at least one processor, to:
generate a user interface including a listing of items identifying phony profiles in the cluster of phony profiles; and
cause presentation of the user interface on a display device.

12. The system of claim 9, wherein a category from the plurality of connectedness categories is email address, the generating of a partial connectedness score comprises comparing respective one or more parts of the respective email addresses associated with the seed profile and the subject profile.

13. The system of claim 9, wherein a category from the plurality of connectedness categories is login time, the generating of a partial connectedness score comprises comparing respective login times associated with the seed profile and the subject profile.

14. The system of claim 9, wherein a category from the plurality of connectedness categories is content similarity, the generating of a partial connectedness score comprises comparing content generated by the seed profile and the subject profile respectively in the on-line social network system.

15. The system of claim 9, a request evaluator, implemented using at least one processor, to:
receive a request from the seed profile in the on-line social network system; and
deny the request based on the malicious user indicator associated with the seed profile.

16. A machine-readable non-transitory storage medium having instruction data executable by a machine to cause the machine to perform operations comprising:
comparing respective registration times and IP addresses associated with a seed profile and a subject profile representing respective members in an on-line social networking system, the seed profile associated with a malicious user indicator;
generating a partial connectedness score based on the results of the comparing;
generating a connectedness score for the subject profile with respect to the seed profile based on the result of the comparing, as a sum of the partial connectedness score and one or more other values;
modifying the subject profile by storing the malicious user indication as associated with the subject profile based on the connectedness score.

* * * * *

UNITED STATES PATENT AND TRADEMARK OFFICE
CERTIFICATE OF CORRECTION

| | |
|---|---|
| PATENT NO. | : 10,158,659 B1 |
| APPLICATION NO. | : 15/097004 |
| DATED | : December 18, 2018 |
| INVENTOR(S) | : Huang et al. |

It is certified that error appears in the above-identified patent and that said Letters Patent is hereby corrected as shown below:

On the Title Page

In item (73), in "Assignee", in Column 1, Line 1, delete "Tehnology" and insert --Technology-- therefor.

In the Claims

In Column 12, Line 22, in Claim 14, delete "profile respectively" and insert --profile, respectively,-- therefor.

Signed and Sealed this
Third Day of March, 2020

Andrei Iancu
*Director of the United States Patent and Trademark Office*